United States Patent [19]

Demont

[11] Patent Number: 4,683,791
[45] Date of Patent: Aug. 4, 1987

[54] CUTTING APPARATUS

[75] Inventor: Allan S. Demont, Holden, Mass.

[73] Assignee: 501 Keene Corp., Norwalk, Conn.

[21] Appl. No.: 576,484

[22] Filed: Feb. 2, 1984

[51] Int. Cl.⁴ .......................... B26F 3/12; B26D 1/553
[52] U.S. Cl. ......................................... 83/874; 83/171;
 83/426; 83/428; 83/433; 83/651.1; 83/870;
 83/16; 83/71
[58] Field of Search ...................... 83/171, 651.1, 870,
 83/874, 871, 428, 433, 426, 16, 71

[56] References Cited

U.S. PATENT DOCUMENTS

| | | | |
|---|---|---|---|
| 3,333,494 | 8/1967 | Smith | 83/171 X |
| 3,786,701 | 1/1974 | Ludwig | 83/651.1 |
| 4,018,116 | 4/1977 | Treffner et al. | 83/171 X |
| 4,077,301 | 3/1978 | Brahm | 83/171 X |
| 4,393,450 | 7/1983 | Jerard | 83/651.1 |

Primary Examiner—Donald R. Schran
Attorney, Agent, or Firm—Wolf, Greenfield & Sacks

[57] ABSTRACT

Apparatus for cutting foam or the like products into predetermined patterns under electronic computer control and employing an apparatus that includes a frame, a table disposed in the frame and for receiving the product that is to be cut, and a carriage carrying at least one hot wire and preferably four hot wires. The carriage is disposed over the table and is suitably supported from the frame. There is provided associated with the carriage, both a first drive means for controllably driving the carriage in a first x direction and second means for controllably driving the carriage in a second Y direction. Control means are provided for controlling the first and second drive means to control product cutting along a predetermined path which in the disclosed embodiment is a diagonal path to provide final foam pieces cut in a pyramidal array configuration.

5 Claims, 14 Drawing Figures

CUTTING APPARATUS

BACKGROUND OF THE INVENTION

The present invention relates very generally to an apparatus for cutting foam blocks into predetermined shapes. More particularly, the invention relates to a hot wire apparatus used to accurately cut foam blocks in a pyramidal array; the array being formed for use in conjunction with a microwave system functioning as an electromagnetic wave absorbing material. Although the apparatus of this invention is described primarily in connection with the cutting to form a pyramidal array, it is understood that the principles of the invention may also be applied in the cutting of other other predetermined-shaped forms.

Present hot wire cutting machines have a number of drawbacks associated therewith including, inter alia, imprecise control of cutting, lack of smoothness of cuts, and complexity and unreliability of machine operation. It is the purpose of the present invention to overcome these aforementioned problems and thus satisfy the following objectives.

One object of the present invention is to provide an improved hot wire cutting apparatus that is computer controlled so as to provide very accurate control of the smoothness of cuts.

Another object of the present invention is to provide an improved hot wire cutting apparatus that provides additional computer control of such parameters as the speed of cutting and the heating and cooling times, respectively, associated with wire excitation.

A further object of the present invention is to provide an improved cutting apparatus that employs improved drive means so as to attain accuracy of cuts and furthermore eliminates chatter marks on the finished product as presently occur with state-of-the-art apparatus.

Still another object of the present invention is to provide an improved hot wire cutting apparatus with improved safety features so that upon the breakage of any one of the hot wires, power thereto is immediately interrupted.

Still another object of the present invention is to provide an improved hot wire cutting machine in which the computer control enables quick and accurate adjustments by way of an input keyboard so as to provide close control for all cutting steps.

A further object of the present invention is to provide an improved hot wire cutting apparatus in which three axes cutting may be carried out with all cuts being carried out in the same apparatus.

SUMMARY OF THE INVENTION

In accordance with the invention, there is provided an apparatus for cutting foam or the like products into predetermined patterns. This apparatus comprises a frame, a table disposed at a lower position in the frame, and having support for receiving the product that is to be cut. A carriage is disposed over the table spaced from the tabletop in an initial position in the carriage and carries at least one hot wire. First drive means are provided associated with the carriage for controllable driving the carriage in a horizontal direction and substantially planar to the table. Second drive means are also provided for controllably driving the carriage in a vertical direction and substantially orthogonal to the table. Control means provided for controlling the first and second drive means to control product cutting along a predetermined diagonal path. The control includes means for providing simultaneous drive to both the horizontal and vertical drive means at relative speeds that control the slope of the diagonal cut. In an alternate embodiment of the invention, the table is also driven rather than being stationary. The table drive is in a horizontal direction.

BRIEF DESCRIPTION OF THE DRAWINGS

Numerous other objects, features and advantages of the invention should now become apparent upon a reading of the following detailed description taken in conjunction with the accompanying drawing, in which.

DETAILED DESCRIPTION

Figures 1, 2:
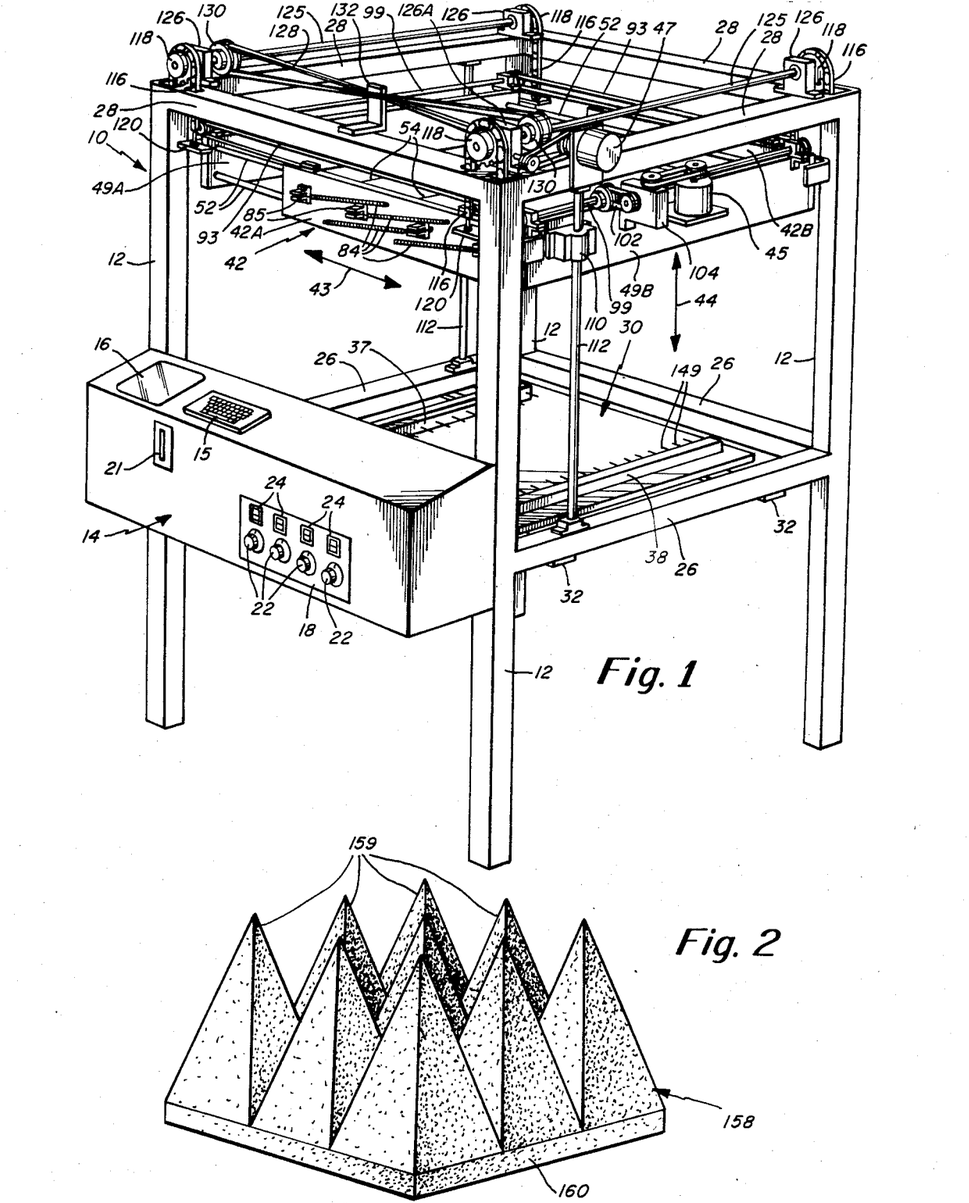
FIG. 1 is a perspective view of the hot wire cutting apparatus of the present invention also illustrating the control panel associated with the mechanical apparatus.
FIG. 2 is a perspective view illustrating the finely cut foam product as formed by the apparatus of FIG. 1.
Figures 10, 11:
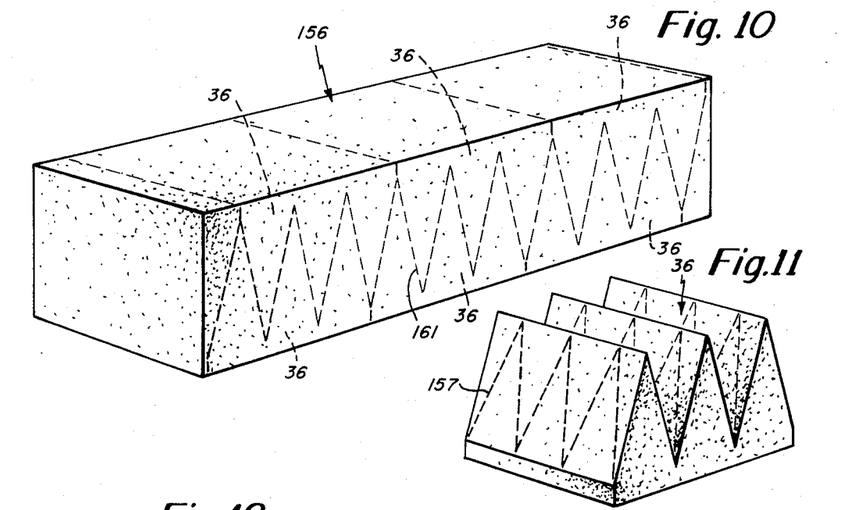
FIG. 10 shows the initial block from which the form of FIG. 2 is cut illustrating in dashed lines, the cutting pattern.
FIG. 11 illustrates one of six blocks separately cut from the block of FIG. 10 and illustrating in dashed line, the pattern to be cut to arrive at the construction of FIG. 2.
Figure 12:
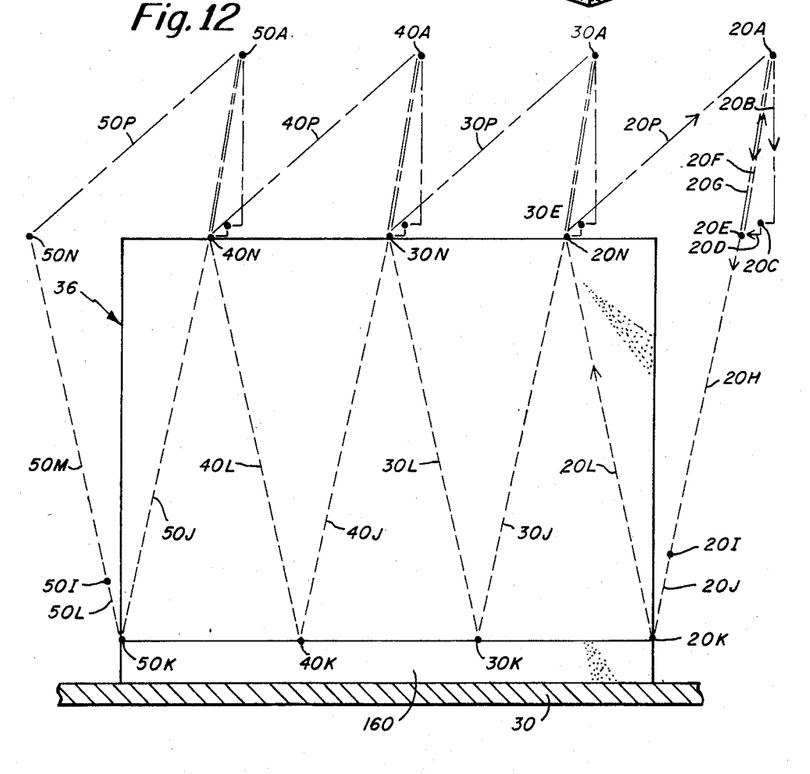
FIG. 12 is a schematic diagram illustrating the manner in which the cutting in the last cutting step is carried out.
Figure 13:
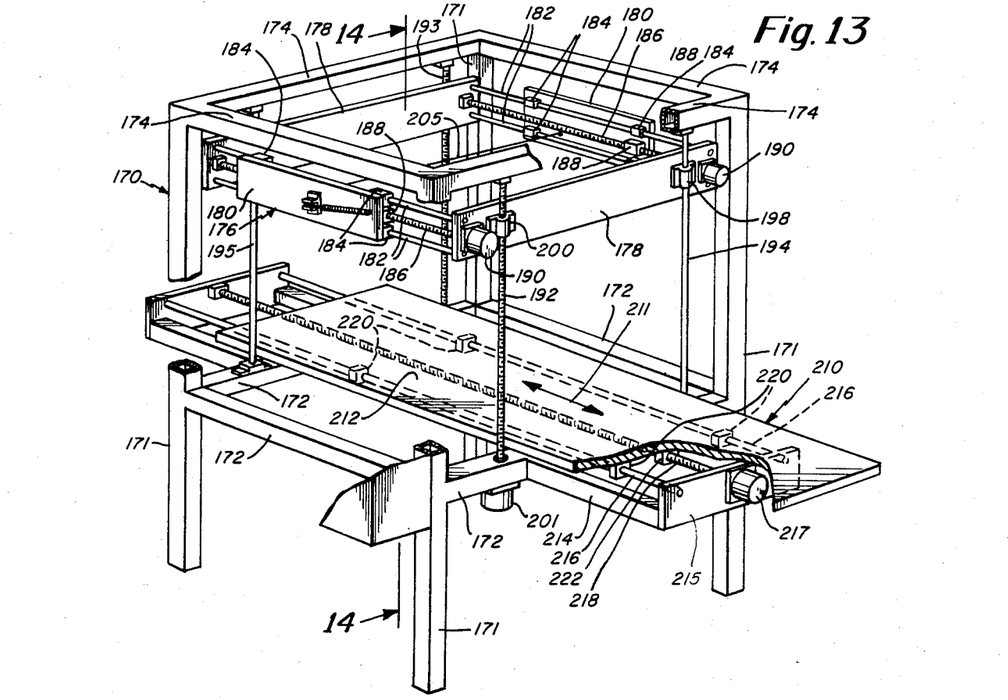
FIG. 13 is a perspective view of an alternate embodiment of the invention in which the initial cutting sequences may also be carried out on the apparatus.
Figure 14:
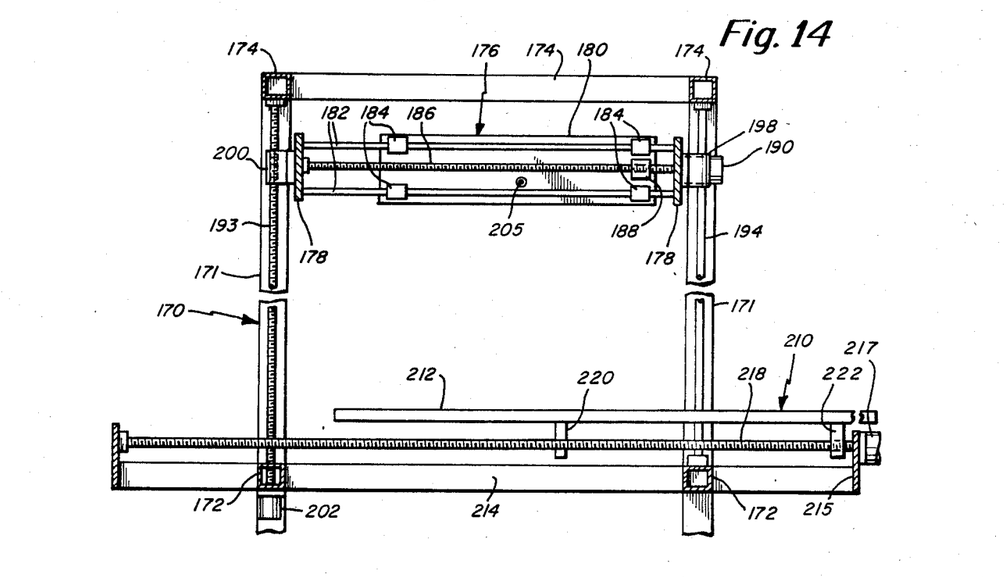
FIG. 14 is a cross-sectional view taken along line 14—14 of FIG. 13 showing further details thereof.

Reference is now made to the perspective view of FIG. 1 which shows a preferred embodiment of the hot wire cutting apparatus of the present invention. FIGS. 2-9 illustrate further details of the apparatus of FIG. 1. FIGS. 2, 10 and 11 illustrate different stages of cutting of the foam. FIG. 12 is a schematic, illustrative of the cutting technique as practiced by the apparatus of FIG. 1. Lastly, FIGS. 13 and 14 show an alternate embodiment of the invention which enables complete cutting of the block of FIG. 10.

The perspective view of FIG. 1 illustrates the hot wire cutting apparatus comprising a frame 10 having four legs defined by upright members 12. At the front of the apparatus, there is provided a control box 14 mounted between the members 12. The control box 14 has a keyboard 15, CRT display 16, and control panel 18. FIG. 1 also shows at the front of the control box 14, a disk drive unit 21. The control panel 18 has four varistats 22 and associated override switches 24. There is one varistat and associated override switch associated with each of the hot wires; thus being four hot wires in the embodiment described.

FIG. 1 also illustrates the frame 10 as including cross-pieces 26 disposed at about the mid-point of the members 12 and cross-pieces 28 at the top of the members 12. The table 30 is disposed at the height of the cross-pieces 26 and is supported from cross-members 32. The table 30 is for supporting the foam block such as the block 36 illustrated in FIG. 11 and further includes hold down strips 37 and 38 referred in further detail hereinafter.

FIG. 1 also illustrates at the top end of the frame 10, the hot wire assembly which includes a carriage 42 and associated drive mechanisms for driving the carriage 42 in the X axis as illustrated by arrow 43 and in the Y axis as illustrated by arrow 44. In this connection in FIG. 1, note the X drive motor 45 and the Y drive motor 47. The carriage 42 comprises carriage plates 42A and 42B. The support for the carriage includes side pieces 49A and 49B and interconnecting rods 52.

Figure 5:
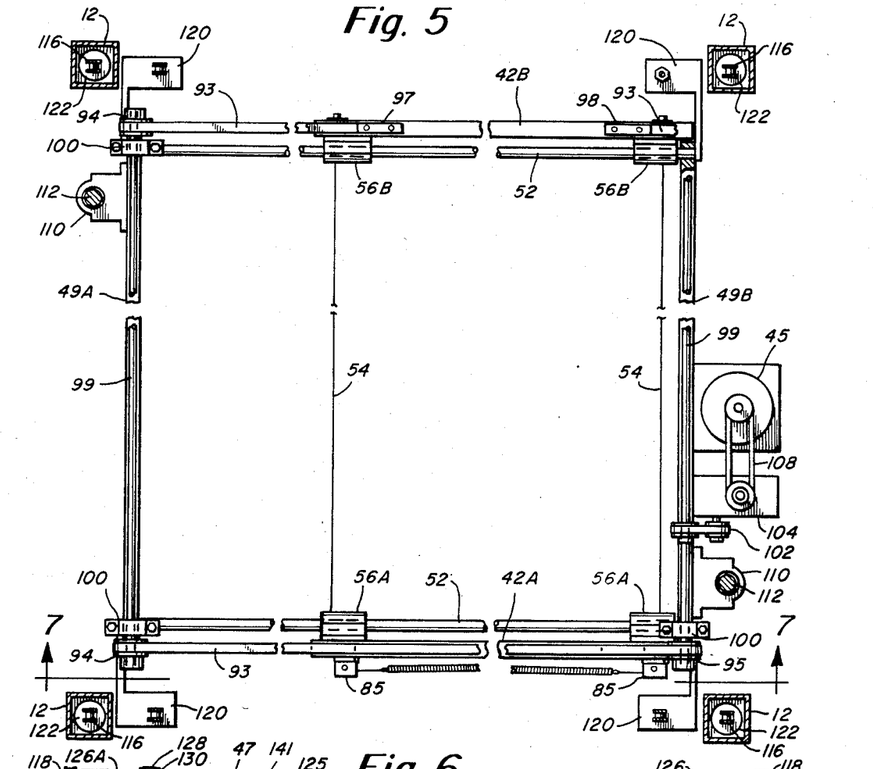
FIG. 5 is a cross-sectional view taken at the top of the apparatus of FIG. 1 and in particular taken along line 5—5 of FIG. 3.

The carriage 42 is for supporting four hot wires 54, two of which are illustrated in, for example, FIG. 5. These hot wires all extend in parallel and are disposed in a horizontal plane extending from the front of the frame 10 to the rear thereof. The carriage 42 is supported so as to be driven along a horizontal X axis from left to right in a position standing before the console or control box 14. The carriage for the most part comprises the aforementioned carriage plates which may be constructed of aluminum $\frac{1}{2}$" thick, 6" high and 26" long. Each of the horizontally disposed carriage plates 42 have associated therewith four slide bearings 56A and 56B, respectively. As illustrated, for example, in FIG. 5, the slide bearings are mounted on the inside surface of the carriage plates and pairs thereof are adapted to ride on the rod slides 52. Each of the rods 52 may be a half inch rod.

Figures 8, 9:
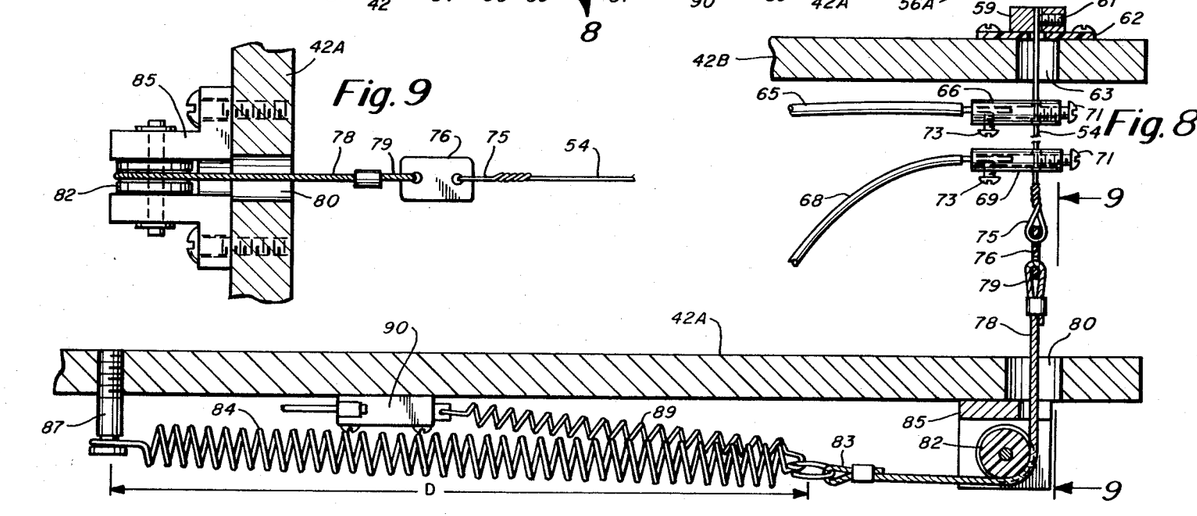
FIG. 8 is a cross-sectional view taken along line 8—8 of FIG. 7 showing further details of the hot wire support.
FIG. 9 is a cross-sectional view taken along line 9—9 of FIG. 8 showing still further details.

With respect to the securing of each of the hot wires 54, reference may be made to FIG. 8 which shows the far end of the hot wire anchored in a round block 59 by means of a set screw 61. Proper electrical isolation is provided by means of the plastic insulator 62 secured to the plate 42B and disposed between the block 59 and the plate 42B. The wire 54 passes through a clearance hole 63 in the carriage plate 42B and is connected to a live wire 65 by means of an attaching clip 66. Similarly, there is provided a second live wire 68 and associated live wire clip 69. The clips 68 and 69 may be of the same construction. Each of the clips 66 and 69 may be comprised of a section of hollow tubing drilled transversely so that the hot wire 54 can pass therethrough and tapped at one end to receive a clamping screw 71. At the other end of the tubing there is also provided a drilled and tapped side hole for receiving a second clamping screw 73. The clamping screw 73 secures the live wire 65, 68, which is inserted into the open end of the tube.

In connection with FIG. 8, the live wire clips 66 and 69, are disposed at opposite active ends of the hot wire 54 relatively adjacent to the carriage side plates. In FIG. 8 it is noted that the near end of the hot wire 54 is provided with a loop 75 which engages with a small rectangular plastic insulator 76. The insulator 76 is drilled at both ends. A flexible braided steel cable 78 has a loop 79 adapted to engage with the other hole in the plastic insulator 76. The steel cable 78, also illustrated in FIG. 9, passes through a clearance hole 80, in the near end carriage plate 42A, then extends about the Teflon pulley 82. The other end of the steel cable 78 is also provided with a loop 83 that is used to connect to one end of the tensioning spring 84. In FIG. 8 the spring 84 is shown having a length D and has an outside diameter of approximately $\frac{1}{2}$". In FIG. 8, the spring 84 is shown in its stretched position to the length D. The length D is typically 10".

With respect to FIGS. 8 and 9, it is noted that the Teflon pulley 82 is supported within a pulley holder 85. The holder 85 is attached by screws or the like to the carriage plate 42A.

In FIG. 8, mention has been made of the spring 84 which is fixed at one end by means of the post 87. At the opposite end of the spring 84 which attaches to the loop 83, there is also provided a second smaller spring 89. The spring 89 also attaches to a microswitch 90 which is in turn secured to the carriage plate 42A. In the position illustrated in FIG. 8, the smaller spring 89 holds the microswitch 90 in a closed position against spring pressure. If the hot wire 54 breaks, the spring biasing force is removed and the switch 90 switches to its opposite open position. This electrical switching action is monitored by the electronics of the system so as to immediately interrupt further current flow to the broken wire; which current flow is normally coupled to the hot wire at the live wires 65 and 68. The electronic detection circuitry includes a gate means which may be an AND gate having the switch coupled to one input thereof so that upon opening of the switch the AND gate is essentially disabled preventing further current flow to the associated hot wire. Of course, the gating arrangement is provided so that only the broken hot wire has power flow interrupted to it. The other hot wires have the power flow maintained.

The interruption of electrical power to the broken wire avoids possible short circuit problems while the rest of the wires continue cutting in accordance with the proper cutting pattern to be discussed hereinafter.

Figure 7:
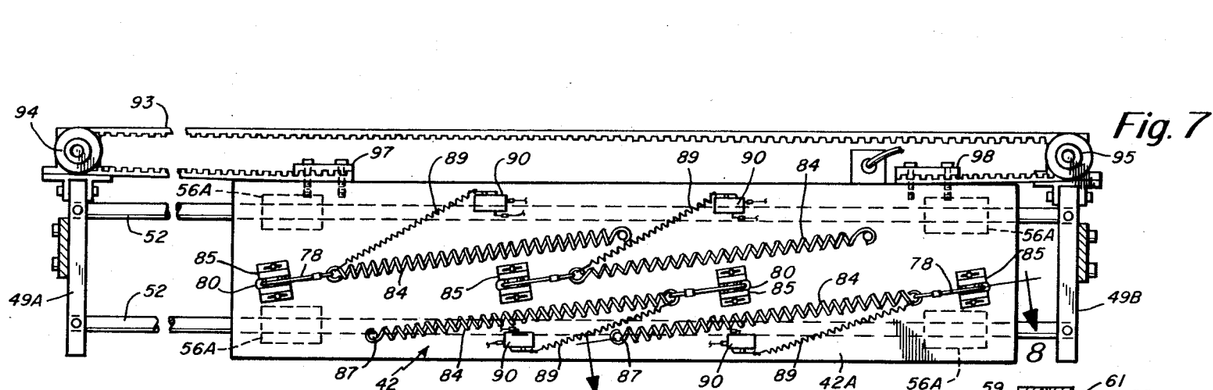
FIG. 7 is a cross-sectional view at the front of the apparatus and as taken along line 7—7 of FIG. 5.

It is noted in the apparatus of this invention that the carriage plates 42A and 42B are not rigidly attached to each other with the only direct connection being by means of the hot wires 54. The plates 42A and 42B are driven in a coordinated manner by a pulley and belt loop system clearly illustrated in FIG. 7. It is noted that FIG. 7 shows the springs 84 and 89 along with the broken wire switch 90 and associated pulley support 85. There are four of these separate hot wire holding mechanisms. FIG. 7 also shows the side pieces 49A and 49B and the slide rods 52 supported by these side pieces. In FIG. 7 there is provided a tooth belt 93 which is looped around the pulleys 94 and 95. The opposite free ends of the belt 93 are secured to the top of the plate 42A by means of belt anchors 97 and 98. The identical belt, pulley, and belt anchor arrangement is also provided in connection with the other carriage plate 42B.

As indicated previously, the slide bearings 56A and 56B and rods 52 are instrumental in guiding the carriage. At the same time the pulley and belt arrangement including the drive belt 93 provides for the translation of the carriage in the direction of the X axis.

Reference may now be made to FIG. 5 which shows both front and rear belts 93 and associated pulleys 94 and 95. FIG. 5 also shows the slide bearings 56A and 56B. Two of the hot wires 54 are illustrated in FIG. 5. The two sets of pulleys are interconnected by shafts 99. Each of the shafts is supported by means of a bearing 100 appropriately supported at the fixed side pieces 49A, 49B.

FIG. 5 illustrates that the right hand shaft 99 is driven by a pair of pulleys interconnected by belts 102 and driven from the gear reducer 104. The gear reducer 104 in turn is driven from the X drive motor 106 by means of the belt 108. The gear reducer 104 as well as the motor 45 are mounted from the fixed side piece 49B.

It is also noted in FIG. 5 that one of the pulleys 94 and its associated bearing block as well as part of the drive belt 93 have been broken away to show the belt anchors 97 and 98. Also, it is noed that the side pieces 49A and 49B support and clamp the four linear bearing rods 52 associated with the X axis drive. Moreover, in FIG. 5 there is shown a guide block 110, one associated with side piece 49A and another associated with side piece 49B. These guide blocks receive respective vertical rods 112. The guide blocks 110 form slide bearings. Each of these blocks is secured to its respective end piece. Each end of the vertical rods are secured to sections of the frame 10 such as illustrated in FIG. 1. As indicated previously, there are two vertical slide rods, although, in an alternate embodiment, four slide rods may be provided, two associated with each end piece at opposite ends thereof.

Figure 3:
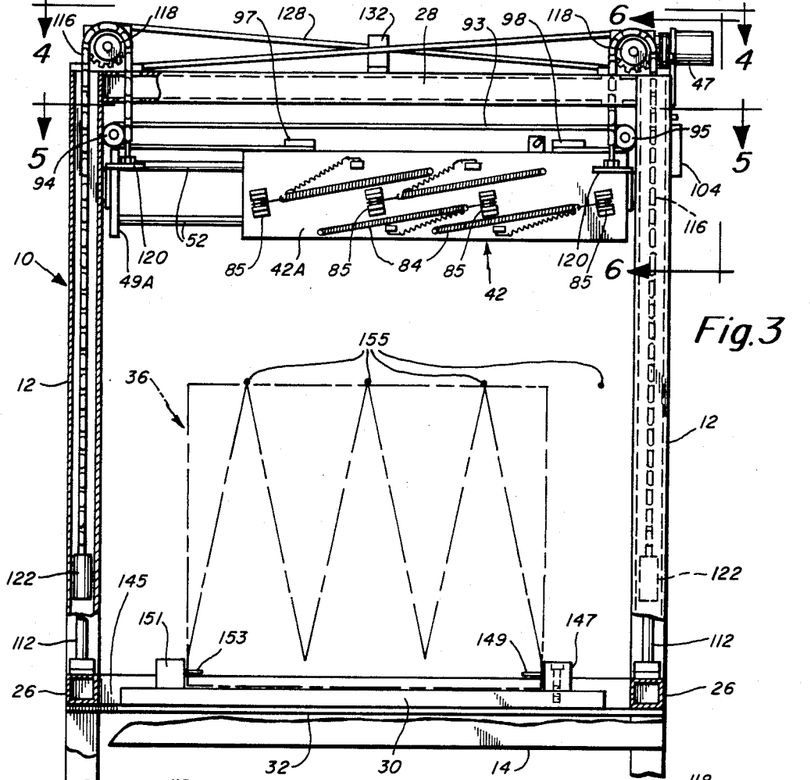
FIG. 3 is a front view partially cut away to illustrate further details of the apparatus of FIG. 1.
Figure 6:
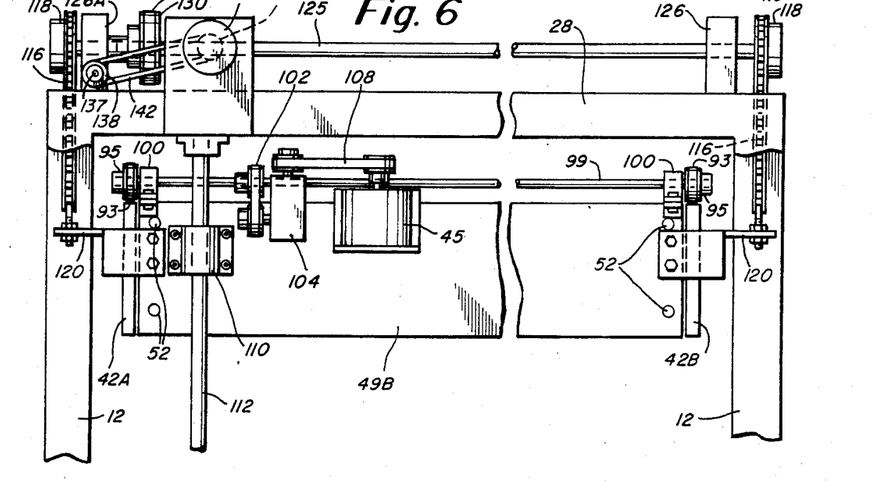
FIG. 6 is a cross-sectional view at the side of the apparatus as taken along line 6—6 of FIG. 3.

Reference is now made to FIG. 3 for a further description of the Y drive portion of the system. The upper left portion of FIG. 3 has been broken away to show the carriage 42 essentially hanging on either end from a chain 116. Each of these chains extend over a sprocket 118. At one end 120, the chain 116 is secured to the movable plate 42A, 42B. At the other end of the chain 116, there is provided a counterbalance weight 122. Each of the upright members 12 is hollow for accommodating the counterbalance weights with their being provided a total of four weights 122, one associated with each of the upright members. In this connection, also refer to FIGS. 5 and 6 which show the hangers 120 affixed to the carriage side plates. Each of the chains 116 are attached to these hangers. Thus, each corner of the carriage is supported and the weight of the carriage is counterbalanced by means of the counterbalance weights 122. Note in particular FIG. 6 which shows th chains 116 attached to hangers 120 at opposite ends of one of the side pieces, namely side piece 49B. FIG. 6 also shows the X drive motor 45 and associated gear reducer 104 as well as the interconnecting drive shaft 99 supported by bearing blocks 100. FIG. 6 also illustrates the slide rod 112 and associated slide block 110.

Figure 4:
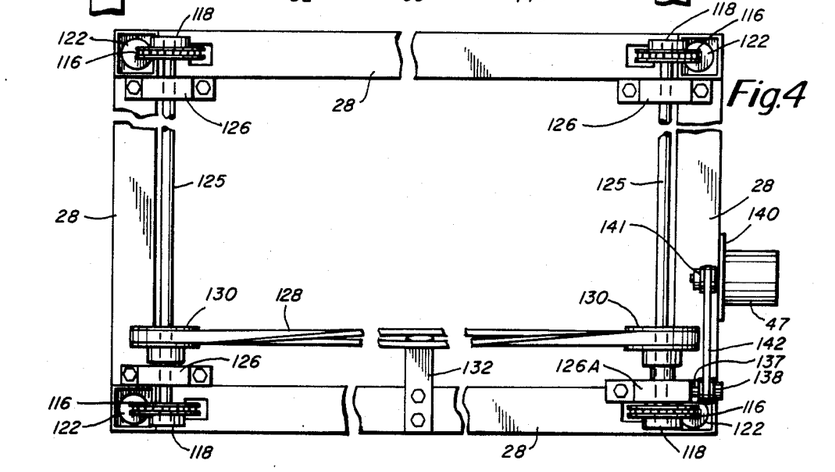
FIG. 4 is a top plan view as taken along line 4—4 of FIG. 3.

With further reference to FIGS. 1, 3, and 4, it is noted that the sprockets 118 of which there are a total of four at the four corners of the frame 10 are interconnected in pairs by means of the shafts 125. The sprocket shafts 125 are supported in bearing blocks 126. Refer to FIG. 4 which shows a clear top view illustrating the sprockets 118, the bearing blocks 126, and the interconnecting shafts 125. The shafts 125 are adapted to be driven in opposite directions of rotation by a cross-over toothed belt and associated pulley system. This system includes the toothed belt 128 and a pair of pulleys 130 which are respectively connected to the shafts 125. A Teflon slide 132 is interposed at the cross-over point of the belt 128 to prevent the belt from wearing through by friction. FIGS. 1 and 4 clearly indicate the position of the Teflon slide 132 which is secured to one of the upper cross-members 28 at the front of the frame 10. As mentioned previously, the sprocket shafts are supported in bearing blocks attached to the tubular steel frame with the exception that the front right bearing block is in the form of a right angle drive/gear reducer 126A. This device is coupled to the end of one of the shafts 125 as clearly illustrated in FIG. 4 and works both as a drive unit as well as a bearing for shaft support. The gear reducer 126A has an input shaft 137 supporting a pulley 138.

The Y drive motor 47 is disposed on a support plate 140 which is in turn secured to the frame top cross-member 28. FIG. 1 also shows the clear placement of the Y drive motor 47. The output of this motor has associated therewith a drive pulley 141 coupling to a belt 142 as adapted to drive from the pulley 141 to the pulley 138. The belt 142 is preferably a toothed belt.

The Y axis drive motor 47 and its associated gearing as represented by the gear reducer 126A is adapted to provide faster drive than that carried out with the X axis drive mechanisms. This is provided because the Y drive traverses approximately 33" vertically along the Y axis while the X drive traverses on the order of only 10" horizontally along the X axis.

As indicated previously, the table 30 is supported by means of support straps 32 substantially at the height of the cross-pieces 26 of the frame 10. It is noted that the table 30 is constructed considerably smaller than the inside dimensions of the frame 10. Note in FIG. 3 the clearance at 145. This allows 3-4" of clearance around the edge of the table 30 to provide clearance for the carriage 42 when the carriage 42 traverses to its lowermost position. In FIG. 3 the carriage is shown at its upper position.

In FIG. 3, the table 32 has on one side, which is the right side in FIG. 3, a hold down bar 147 which is fixedly secured to the table 30. The hold down bar 147 has a plurality of equally spaced protruding pins 149. At the other side of the table 30, there is provided a weighted hold down bar 151 which also has a similar set os spaced pins 153 associated therewith. In FIG. 3 the precut foam block 36 is also illustrated in phantom. At the top of the block 36 are shown the hot wire start positions at 155. Registration marks are also preferably provided associated with the hold down bars 147 and 151 so that the foam block is properly in position relative to these bars. The foam block is first engaged with the fixed bar 147 and then the weighted bar 151 which is movable is pushed into the foam block with the weight of the bar and the associated pins 153 holding the foam firmly against the fixed hold down bar 147.

FIG. 10 illustrates the foam block 156 that is initially started with. This is a relatively large block of foam that may be about 75" long, 25" deep and 22¼" high. In connection with the embodiment of the invention illustrated in FIG. 1, the precutting of the block 156 to form the block 36 of FIG. 11 may be carried out with separate manual means so as to cut the foam into six blocks approximately 24" square with three wedges each, as illustrated in FIG. 11. FIG. 11 also shows in dotted outline 157 the subsequent cuts that will be made to form the final block 158 illustrated in FIG. 2. This block is comprised of a series of nine pyramidal-shaped peaks 159 extending from a base 160.

In connection with the manual technique for cutting the block 156 into smaller blocks 36, there may be provided a separate hot wire frame not shown herein suspended on a counterbalanced cable and manually guided by an operator on either side of a table following a plywood pattern with the foam on the table in between. This plywood template carries out the cutting along the lines 161 shown in dotted in FIG. 10 so as to form the six blocks 36 of FIG. 11. In an alternate mode of operation, it is preferred to use the alternate embodiment of the invention illustrated in FIGS. 13 and 14 and discussed in further detail hereinafter. With this alternate embodiment the cutting of the block 156 to form blocks 36 is also carried out on the same apparatus but preferably using a single hot wire as will be described hereinafter.

FIG. 12 is a schematic illustrating the manner in which the cutting of the precut block 36 is carried out. Thus, in FIG. 12 there is shown the precut block 36 with its face 160 and illustrated resting upon the table 30. For the sake of clarity, the hold down structure is not illustrated in FIG. 12.

FIG. 12 is basically a schematic illustrating the manner in which the wires track in cutting the foam block. In FIG. 12 the foam block is indicated in solid line and the tracking of the wires is illustrated by dashed lines. The wires, which total four, are illustrated in the different positions as they carry out the cutting operation.

The wire positions 20A, 30A, 40A, and 50A, represent the "at home" position of the wires. It is noted that in this position the wires are substantially above the block 36. The operator at the control console 14 operates a system via the keyboard to enter into a Run Mode in which the computer controls the operation of the stepper motors, namely motors 45 and 47 in a rapid traverse along lines illustrated by line 20B to a rough line-up position 20C. For simplicity in this description, reference will be made to transitions from position 20A; it is being understood that the same transitions also occur from the other positions 30A, 40A, and 50A. It is noted that the transition along line 20B is only in the Y axis. However, this rapid traverse could also be on a diagonal with both the X and Y drives operating at the same time.

Next, the operator via the keyboard can cause the wires to jog to the correct start position such as by means of directional arrows on the keyboard to indicate the left and right directions and up and down directions causing incremental positioning of the wires. This is desirable in order to make up for any discrepancies in the foam height.

The operator then actuates a RETURN button which causes wire movement along line 20D representing a jog down and to the left to a start position 20E. This start position is then stored in memory and represents the initial starting position for cutting. The return line 20F represents a rapid traverse with simultaneous X and Y drive that can be carried out under keyboard control at any time if desired. When they want to do this if once the starting position is reached, it is determined that the block as to be moved, then the rapid traverse along line 20F may be used to get back to the very initial starting position 20A.

When the carriage traverses along line 20F to the home position 20A, there is a continuing display on the CRT and on the CRT there may even be questions brought up regarding such variables as speed to provide any necessary adjustment. The carriage then reverts to the start position by way of path 20G to start position 20E. The wires are warmed up say for four seconds. This action is carried out in a rapid traverse along path 20G. In the sequence of operation, only wires 30, 40 and 50 are turned on. Wire 20 need not be excited because it will not contact any foam and start a cut until position 20K is reached.

Under operator control, and commencing from the start positions, 20E, 30E, 40E, and 50E, there is then caused simultaneous activation of both the X and Y drives at the desired cutting speed with the wires 30, 40 and 50 cutting along respective paths 30J, 40J and 50J. In this connection, the relative speed between the two X and Y drives determine the slope of the cuts 30J, 40J and 50J.

During the cutting operation of the wires 30, 40 and 50, the wire 20 reaches a point 20I at which it is activated to provide warm-up of the wire 20. This preferably occurs at approximately four seconds before the wire starts its cutting action at position 20K. When all of the wires reach their respective positions 20K, 30K, 40K and 50K, there is provided a pause or a delay for a few seconds which may be, for example, two or three seconds. This pause is provided in order to let the wires straighten out because of the frictional drag of cutting and because of the fact that the wires have cooled somewhat while cutting. Because of this, they may be somewhat stretched out and the middle essentially has to catch up with the ends of the wire. It is also desired, because of the cooling effect of passing through the foam, that this delay provide a period during which heating continues so as to bring the wires up to temperature before starting the next upward diagonal cut represented by the lines 20L, 30L, and 40L.

The upward diagonal cuts are carried out preferably at a slower speed than the downward diagonal cuts due to the heat loss of the wires while in the foam. Also, wire 50 is controlled so as to have power thereto interrupted about the time that the wire exits from the foam on the downward cut. There is usually a small amount of excess foam at that end of the block that may be trimmed off later so that the wire is still essentially in the foam mass at the point 50K. On the short leg 50L to position 50I, the wire is maintained activated to allow any of the excess foam residue to burn off. This burn off period is typically three seconds. Thus, at point 50I the wire 50 is deactivated. During the rest of the travel along path 50M, the wire 50 remains non-excited while wires 20, 30 and 40 continue traversing along their respective paths 20L, 30L and 40L to complete the cutting action.

The wires 20, 30 and 40 finally reach the end positions 20N, 30N and 40N, respectively, which correspond actually to the start positions previously referred to such as start position 20E and 30E. At this upper position, the wires have cleared the foam but are remained excited for a burn off period which may be approximately three seconds. To go to the home position, the wires may then traverse along line 20P, 30P, 40P, and 50P, respectively.

It is noted in going through the description relating to FIG. 12 that there are many variables that can be set by the operator. These variables can all be controlled by way of computer control via the keyboard 15 with storage being provided by the disk drive 21. Some of these variables include by way of example, the wire warm up time, the speed of the first cut, the delay of turn on of wire 20, the delay at the bottom of the cut, the speed differential between the downward and upward cuts, the delay of the turn off of the wire 50 and the delay of turn off of the wires 20, 30 and 40 at the end of their cuts. Also, the speed of the X and Y drive motors is also operator accessible. The differential in these speeds determines the slope of the cut.

An alternate embodiment of the present invention is illustrated in FIGS. 13 and 14. This embodiment of the invention is adapted to provide all cutting operations on the original block 156. Thus, in this alternate embodiment, there is provided a frame 170 which is substantially identical to the frame 10 illustrated in FIG. 1. The frame 170 includes four upright members 171, cross members 172 at about a mid-point up the upright members, and top cross members 174. Part of the frame is cut away to illustrate further details. At the top of the frame 170 there is provided a carriage 176 which includes fixed side plates 178 and movable side pieces 180. The side pieces 180 are supported by guide rods 182. For this purpose there are provided slide bearings 184 secured to the side pieces 180 and each having the slide rod extending therethrough. The drive for the side pieces 180 is by means of respective lead screws 186. The lead screws have associated therewith a screw follower 188. Two X drive motors, one on each side are shown. These motors 190 drive the respective lead screws 186. The motors 190 are adapted for uniform control therebetween. Both of the motors 190 are secured to one of the side plates 178 as clearly illustrated in FIG. 13.

With regard to the Y axis drive, there are provided Y drive screws 192 and 193 adjacent to diagonal opposite corners of the frame. There are also provided a pair of slides 194 and 195. The slides 194 are supported in bearings 198 which are attached to the side plate 178. Similar support is provided on the other side of the frame. Also, the Y drive lead screws 192 and 193 are also supported at the respective side plates 178 by means of ball bearing followers 200. These followers receive the lead screws such as illustrated in FIG. 14 with the lead screw 193 being received by the follower 200.

In order to provide drive to the two lead screws 192 and 193, there are provided Y axis motors 201 and 202. FIG. 13 shows the motor 201 for driving the lead screw 192. FIG. 14 shows the motor 202 that drives the lead screw 193. The additional slides 194 and 195 guide the carriage as drive occurs in the Y direction.

It is noted that in FIG. 13 there is provided only a single hot wire 205. However, it is preferred to have a carriage capable of carrying the aforementioned four hot wires. The operation for the initial cut on the block of FIG. 10 is adapted to use only a single wire but the subsequent cuts previously discussed use the four wires. For the sake of simplicity and illustration, only a single wire is illustrated in FIGS. 13 and 14.

The alternate embodiments of FIGS. 13 and 14 also illustrate the movable table 210 rather than the fixed table illustrated in the embodiment of FIG. 1. This table 210 is movable in the X axis direction as indicated by the arrow 211. The table 210 includes a table top 212 which is movable and table base 214. The top 212 is supported from the base 214 by means of a pair of slides 216 and a lead screw 218. There are two slide bearings 220 associated with each of the individual slides 216. There is also a single screw follower 222 engaging with the lead screw 218. At the side of the apparatus there is provided as part of the base 214 an end plate 215 that supports the table X drive motor 217. The motor 217 drives the lead screw 218 to move the table top 212 in the X axis direction.

Although not illustrated in FIG. 13, it is understood that the table top 212 has means associated therewith for holding the foam block in place such as the bar and in arrangement illustrated in FIG. 1. The operation in conjunction with the table 210 is carried out to cause the cut 161 shown in FIG. 10 in the block 156. In other words, the block 156 is inserted on the table 210, is held in position, and then the X and Y drives associated with the hot wire 205 are controlled so as to provide the cut pattern illustrated in FIG. 10. This can all be accomplished under computer control so that the slopes of the cuts and the associated speeds of cutting and other parameters can be closely controlled. In practice, in order to provide the cut pattern 161, the table X drive motor 217 is controlled so that there is traverse of the table 210. At the same time, the Y drive is provided and it is the combination of the table X drive and the hot wire Y drive that provides the pattern 161. This operation also separates the large block into six smaller blocks of approximate 2 cubic foot size.

One of the advantages to the system of FIG. 13 as is noted, is that no counterweights are necessary because of the use of the screw and bearing ball drive system which replaces the belts, pulley, and chains illustrated in FIG. 1.

Included among the features of the present invention is the computer control drive system to accurately control smoothness of cuts, speed of cuts and also the adjustment of many other parameters associated with, for example, the heating and cooling times for the wires. Another feature of the present invention is concerned with the safety aspect including the concept of having a broken wire switch associated with each wire tied in through electronic gate means to kill power to any wire that breaks but still allowing the rest of the operation to proceed. Also, in accordance with the feature of the invention, there is provided in one embodiment, rapid pulse motors and associated linear bearings to attain accuracy and eliminate chatter marks inherent in some of the present state of the art machinery.

A further feature of the invention is the capability by means of computer control to make even minute adjustments to the hot wires. A further feature of the invention is the improved spring tensioning control. The hot wire tensioning spring preferably provides about 10 pounds of pull when stretched to 10".

Another feature having to do with the control of the current to the hot wires relates to the use of transformer means for stepping down the typical 110 volt voltage to approximately 60 volts which is coupled to the varistats 22. By means of the varistat control the final voltage coupled to the wires can be very precisely controlled. The preferred final voltage is on the order of 28 volts at 9 amps. Also, as illustrated in FIG. 1, a further feature is the use of override switches 24 which provides selective individual control of the wires so that different combinations of wires can be activated.

Having described one embodiment of the present invention, it should now be apparent to those skilled in the art that numerous other embodiments are contemplated as falling within the scope of this invention.

What is claimed is:

1. Apparatus for cutting foam or the like products into predetermined patterns comprising;
    a frame,
    a table disposed at a lower position in the frame and having means for receiving the product that is to be cut,
    means for driving the table only in one non-oscillatory horizontal direction in the frame and during a first cutting sequence, a carriage carrying at least one hot wire disposed over the table and spaced from the table in a pre-cutting position of the carriage, means for supporting the carriage from the frame, drive means associated with the carriage for controllably driving the carriage only in one non-oscillatory vertical direction in the frame relative to the table and orthogonal to said direction of table drive and during a first cutting sequence, and control means for controlling the carriage and table drive means to control product cutting along a predetermined diagonal path including means for providing simultaneous drive to both said carriage and table drive means at relative constant speeds that control the slope of the diagonal cut.

2. Apparatus as set forth in claim 1 wherein said carriage has in addition, a second drive means for controllably driving the carriage in a horizontal direction.

3. A method of cutting foam blocks to predetermined sloped patterns, comprising the steps of; supporting the block on a table in a framework, providing a carriage to carry at least one hot wire disposed over tne table and spaced from the table in a pre-cutting position of the carriage, providing first drive to the table to cause the table to move linearly at a constant speed in only one horizontal direction during a first cutting sequence, providing a second drive to the carriage to cause the hot wire to move linearly at a constant speed in only one vertical direction during the first cutting sequence, and controlling the first and second drive to provide product cutting along a predetermined diagonal path including simultaneous drive to both first and second drive means at relative constant speeds that control the shape of the diagonal cut.

4. A method as set forth in claim 3 including controlling the drive to provide cutting along a second path during a second cutting sequence wherein the horizontal movement continuous in the same direction during the first and second cutting sequences and the vertical movement in the second cutting sequence is opposite in direction to that in the first cutting sequence.

5. A method as set forth in claim 4 including repositioning the block after a first series of cutting sequences and thereafter cutting the block in a second series of cutting sequences to form a finished block with pyramidal peaks.

* * * * *